United States Patent [19]

Houben et al.

[11] Patent Number: 6,043,311

[45] Date of Patent: Mar. 28, 2000

[54] PRINTABLE SWELLING PASTE AND ITS USE IN CABLE INSULATION AND NON-WOVEN FABRIC PRODUCTION

[75] Inventors: Jochen Houben, Kempen; Winfried Krug, Krefeld, both of Germany

[73] Assignees: Stockhausen GmbH & Co. KG, Krefeld, Germany; Blydenstein-Willink N.V., Hengelo, Netherlands

[21] Appl. No.: 08/973,468

[22] PCT Filed: Jun. 10, 1996

[86] PCT No.: PCT/EP96/02503

§ 371 Date: Dec. 16, 1997

§ 102(e) Date: Dec. 16, 1997

[87] PCT Pub. No.: WO97/00280

PCT Pub. Date: Jan. 3, 1997

[30] Foreign Application Priority Data

Jun. 16, 1995 [DE] Germany ............ 195 21 431

[51] Int. Cl.⁷ .................................................. C08L 33/00
[52] U.S. Cl. ......................................................... 524/522
[58] Field of Search ............................................ 524/522

[56] References Cited

U.S. PATENT DOCUMENTS

| | | | |
|---|---|---|---|
| 4,373,036 | 2/1983 | Chang | 523/120 |
| 4,389,513 | 6/1983 | Miyazaki | 525/186 |
| 4,542,168 | 9/1985 | Chang | 523/120 |
| 4,727,097 | 2/1988 | Kobayashi | 523/408 |
| 4,783,510 | 11/1988 | Saotome | 525/329.7 |
| 4,806,578 | 2/1989 | Kobayashi | 523/402 |
| 4,898,780 | 2/1990 | Seitz | 523/200 |
| 5,118,435 | 6/1992 | Nieh | 524/388 |
| 5,308,701 | 5/1994 | Cohen | 525/329.9 |
| 5,492,962 | 2/1996 | Lahrman | 524/556 |
| 5,760,080 | 6/1998 | Wada | 524/559 |

*Primary Examiner*—Paul R. Michl
*Attorney, Agent, or Firm*—Oblon, Spivak, McClelland, Maier & Neustadt, P.C.

[57] ABSTRACT

The present invention relates to a printable formulation of a superabsorbent polymer and to the application forms of the product, for example, for cable insulation and for the production of nonwovens. The formulation is preferably supplied in the form of a two-component package consisting of precrosslinked superabsorber and reactive cross-linking agent and mixed in-situ to form the product. The obtained printing paste is printed on a substrate, for example, a nonwoven. For cable insulation purposes, the product is subsequently incorporated into the cable in a conventional manner.

22 Claims, No Drawings

PRINTABLE SWELLING PASTE AND ITS USE IN CABLE INSULATION AND NONWOVEN FABRIC PRODUCTION

The present invention relates to a printable swelling paste and its use for cable insulation and for the production of nonwovens.

BACKGROUND OF THE INVENTION

FIELD OF THE INVENTION

Cables are durable industrial goods and must therefore meet higher demands with respect to operational reliability. Damage caused by ingress of water can be avoided by a cable insulation making the cables watertight. In "Drahtwelt", number 5/1992, several methods are described to provide power cables, communication cables, and optical fiber cables with a watertight insulation in the longitudinal direction. The main emphasis is concentrated on discussing swelling powders and swelling nonwovens based on polyacrylate which are incorporated into the cable construction. Superabsorbent polymers have been known for a long time; they are commercially available in the form of powders, for example, under the tradenames FAVOR® or CABLOC®. However, powder processing involves heavy technical expenditure, and—as soon as abrasion of the product results in respirable, extremely fine dust portions during processing and production—it is critical from the aspect of industrial medicine and should therefore be avoided. The alternative of polymerizing a monomer solution on the prefabricated surfaces or threads is reserved for chemical works because of the required protective atmosphere and the safety regulations to be observed; for this reason, it cannot be transferred to plants of other industries, for example, the printing, cable, or textile industry. Moreover, a highest possible solids content and rapid swelling of the product should be aimed at to seal and limit water invasion into the cable as quickly as possible.

EP 188 091 seems to solve this problem. It describes that the aqueous solution of an uncrosslinked prepolymer is applied on a nonwoven by padding. A relatively high molecular weight of the prepolymer is chosen to obtain the correct viscosity for padding. The resultant stringing leads to the fact that all fibers are covered with the prepolymer solution. For this reason a very rigid, inflexible nonwoven is obtained after cross-linking, and this is very unfavorable for technical further processing, for example, rolling for storage or transport purposes.

EP 269 778 describes a swellable cable insulating tape made of a nonwoven and having superabsorber particles applied thereon. These superabsorbent particles swell on contact with water and therefore prevent propagation of water along the longitudinal axis of the cable. The problem of dust formation is not solved.

EP 271 171 describes a tape for the insulation of cables which comprises microcapsules expanding at different temperatures and thereby causing the seal of the cable. Expansion of the microcapsules takes place already during the cable production, the manner the cable is sealed against leakage in operating state is not disclosed.

EP 357 474 describes the spraying of low-viscous, aqueous solutions of uncrosslinked polyacrylic acids on sheet-like fabrics and the subsequent thermal cross-linkage to form water-swellable gels by means of simultaneously applied cross-linkers. The problem of the proposed method is that spraying results in an irregular polymer distribution on the surface of the sheet material, and that the other forms of application briefly mentioned in this publication, such as printing or doctor-blading, cannot be carried out in practice because of the unfavorable viscosity behavior of uncrosslinked polyacrylic acids.

EP 391 012 describes an extrudable mixture for cable insulation which is based on butyl rubber and comprises a synthetic swelling powder based on polyacrylate. Sealing the gap between rubber sheath and outer conducting layer can be omitted with this mixture, however, it requires special machinery.

EP 397 410 describes the use of polyglycol semiesters of (meth) acrylic acids which, at first by incorporation through polymerization, and subsequently with thermal aftertreatment, can be cross-linked via the free alcohol group through an ester bond. This use has the decisive disadvantage that cross-linking periods of more than half an hour are required at temperatures of up to 200° C., i.e., temperatures not harming the materials. This period is too long for an economically effective application.

EP 645 429 describes a water-miscible thickener for print pastes based on an oil-in-water emulsion. A mixture of carboxymethylcellulose and a copolymer of acrylic acid and acrylamido-2-methyl-propane sulfonic acid salt is used as polymer. Swelling properties of the paste so obtained are not disclosed.

SUMMARY OF THE INVENTION

It is accordingly the object of the present invention to provide a printable swelling paste based on a superabsorber, which can be applied in one operation on prefabricated sheet materials of any kind, for example, on wovens or nonwovens, and which, after a subsequent secondary thermal treatment, is capable of swelling rapidly in the presence of water or aqueous solutions, thereby multiplying the initial volume. This paste has to be free from any easily inflammable and dangerous substances, and at room temperature it should have the viscosity behavior desirable for a printing medium with a simultaneous low tendency to stringing. For economic reasons and because of the thermal loading capacity of the base material, the maximum cross-linking time at temperatures of 200° C. may only amount to a maximum of 5 minutes. After that, the printed sheet material must be capable of being rolled up without sticking together. In addition, the process should be feasible on the existing machinery by means of conventional technology with the slightest possible changes.

DETAILED DESCRIPTION OF THE INVENTION

Surprisingly, the object according to the present invention could be achieved by a mixture of two components wherein component 1 (95–99.9 percent by weight of the total mixture) is an aqueous solution of a precrosslinked poly (meth)acrylic acid which may partially be present as a salt. Potassium, sodium or ammonium ions may be used as counterions. Component 1 (95–99.9 percent by weight of the total mixture) may also be an aqueous solution of a precrosslinked poly(meth)acrylic acid which comprises acrylamide as comonomer. However, the carboxyl-group-containing monomer must then always be present in excess.

The portion of carboxyl-group-containing monomer amounts to at least 50 mol-%, preferably 75 mol-%, relative to the total amount of monomers used. Particularly preferred are polymers wherein more than 95 mol-% are carboxyl-group-containing monomers.

Depending on the desired quantity applied, the chosen stencil, and the intended use, primary cross-linking which results in the viscosity behavior desired during printing or doctor-blading must be of a differently high degree. The presence of further additives in this aqueous polyacrylic acid, which are not incorporated by polymerization, may have an advantageous effect. Particularly suitable are substances to reduce the brittleness (hardness) of the dried product and those to decrease tackiness.

Substances to reduce brittleness include, for example, polyethylene glycols, polypropylene glycols, or mixed polyalkoxylates; in addition, polyalkoxylates based on polyvalent alcohols, such as glycerol, trimethylolpropane, and butanediol. Surfactants having HLB values of more than 10 are also suitable, for example, alkyl polyglucosides, or ethoxylated sugar esters, for example, polysorbates commercially available under the name Tween of ICI.

Suitable hardness-reducing substances include, for example, cationic surfactants, such as alkyl trimethylammonium chlorides or dialkyl dimethylammonium chlorides or dimethyldistearylammonium chloride; in addition, alkyl benzyldimethylammonium chloride or the corresponding methosulfates or quaternized tallow-fat-imidazolinium methosulfates in amounts of 0 to 5%-wt., relative to component 1. These substances may be introduced either prior to or after the polymerization; they bind to the polycarboxylate chain in a cation/anion interaction and thus cause a softening effect and at the same time an improvement in the absorption rate for aqueous solutions (see comparison between Example 1 and Example 2). Another advantage of these substances is their biocidal effect which can prevent an undesired biodegradation of the swelling agents. This property is of particular importance for underground cables.

Suitable tack-inhibiting substances are, for example, inorganic or organic finely powdered separating agents in an amount of 0 to 2%-wt., relative to component 1. Examples thereof include: powdery wood or powdery wood products, such as wood flour, pulp fibers, tree barks, cellulose flocks, cotton linters, and the like; mineral fillers, such as perlite; synthetic fillers, such as nylon flocks, rayon flocks, and the like; furthermore, diatomaceous earth, slag, talc, clay, flue ash, coal dust, magnesium silicates, fertilizers or their mixtures. Highly dispersed fumed silicas, such as those marketed under the tradename Aerosil® of Degussa AG, are preferably used. These substances reduce stringing and, at the same time, tackiness of the products which is connected with the softening effect of cationic surfactants (compare: Example 1 with Example 3).

Compounds having at least two groups which are capable of being incorporated by polymerization may be used as primary cross-linking agents in an amount of 0.05–1.0, preferably 0.1–0.5%-wt., relative to the actual monomer or monomer mixture of the component. Suitable cross-linkers of this kind include, for example, di-, tri-, or polyvinyl compounds, such as divinylbenzene and divinyltoluene, although others are not precluded. Additionally suitable are di-, tri- or polyesters of unsaturated carboxylic acids, such as acrylic acid, methacrylic acid, or maleic acid with di-, tri-, and polyols, e.g., ethylene glycol, trimethylolethane, trimethylolpropane, glycerol, or ethoxylated di-, tri- or polyols. Further suitable primary cross-linking agents include, e.g., alkylenebisacryl-amide, such as N,N'-methylenebisacrylamide or N,N'-methylenebismethacrylamide, carbamyl esters produced by reacting polyisocyanates with hydroxyl-group-containing substances, or di-, tri- or polyallyl ethers of di-, tri- or polyols. Suitable primary cross-linking agents also include allyl esters of unsaturated carboxylic acids, such as allyl acrylate and allyl methacrylate; as well as di-, tri- and polyallyl esters of polycarboxylic acids, such as diallyl phthalates or diallyl adipate. Di- or triallylamine is also suitable for the use as primary cross-linkers. The primary cross-linking agents may also be used as mixtures. Trimethylolpropane triacrylate, N,N'-methylenebisacrylamide, ethoxylated trimethylolpropane triacrylate, and triallylamine, or mixtures of the above-mentioned compounds are preferably used. The actual reactive cross-linker is added as component 2 of the swelling paste shortly before printing, in an amount of 0.1–5 percent by weight, relative to the total amount of component 1, preferably 0.5–3.0%-wt., and is homogeneously mixed. Compounds having at least two functional groups capable of reacting with carboxylate or carboxylic acid functions under thermal activation within a short time may be used as the actual reactive cross-linker. These compounds include, for example, di- and polyfunctional epoxides, aziridines, polyglycidyl ethers, and epihalohydrins, as well as mixtures of the above-mentioned substances. A polyethylene glycol chain of different length may be inserted between the cross-linker functions. (Poly) ethylene glycol bisglycidyl ether and in particular ethylene glycol bisglycidyl ether, and also mixtures of the above-mentioned compounds are preferred. These are marketed, for example, by Nagase Chemicals Ltd. under the tradename Denacol.

Further suitable reactive cross-linkers include water-soluble polyisocyanates or water-soluble polyesters of polyglycols with carboxylic acids having low boiling points, such as formic acid or acetic acid.

Compounds wherein cross-linkage must be built up by esterification of amidation of free alcohol functions or amine functions are unsuitable for the use as second component, because they do not react completely within the drying periods normally used in the printing or textile industry for economic reasons (cf. Comparative Example 3).

Components 1 and 2 are combined and homogeneously mixed in the stated quantity ratios shortly before application (maximum 48 hours, preferred maximum 8 hours). Speedy processing of this two-component mixture, in general on the same day, is expedient, since the initially low-viscous mixture may thicken, depending on the storage temperature and storage period. Suitably, the two-component mixture is delivered in a combination pack. Part 1 of the combination package consists of the precrosslinked polymer, and part 2 of the combination package consists of the measured amount of reactive cross-linker. The total amount of the product in the combination pack is measured such that the batch is processable within one day, for example.

The swelling paste so produced may be applied on a prefabricated sheet material or on threads according to known methods. Printing or doctor-blading on a substrate, for example, a woven fabric, a nonwoven fabric, paper, or films, by means of a stencil is preferred to obtain an even pattern.

Subsequently, the polymer so applied must be cross-linked, this may be achieved by a heat treatment. The duration of the heat treatment depends on:
  the applicable temperatures and
  the reactivity of the chosen actual reactive cross-linker,
  and on the neutralization degree of the polymer-bound carboxyl functions.

The temperature may range between 100° C. and 200° C., preferably between 150° C.–200° C. In any case, the cross-linking temperature must be above the boiling point of the solvent (for example, water) and below the shrinkage temperature of the woven/nonwoven. For economic reasons the available time is below 5 minutes.

Nonwovens for agriculture are used as irrigating mats (irrigation of greenhouses, outdoor cultures, and plant containers), in agricultural textiles (e.g., to grass hillsides, embankments, and roofs), and to store available water.

In clothing industry, the nonwovens manufactured according to the present invention serve to absorb sweat, for example, in textiles, insoles, and working clothes.

In funeral homes textile coffin inserts are used to absorb body fluids exudating from the dead body.

In order to test the swelling paste, it was printed on a polyester fabric by means of a stencil and then dried. With the exception of Comparative Examples 1 and 2 (uncrosslinked polyacrylates), an even pattern of dots was always achieved. The products were dried by placing them under an IR-heat radiator (manufacturer: Elstein) for 3 minutes.

Application Measurements

Measurement of swelling height and swell rate

In order to measure the swelling height and the swell rate, a circular cut-out (50.9 $cm^2$) of the coated sheet material is placed in a plastic cup having an inner diameter of 80.5 mm and a height of 30 mm. A thin polyester nonwoven (thickness 0.05 mm) and then a circular punch having a diameter of 80 mm and a weight of 100 g are placed on this nonwoven. The punch is provided with 60 through bores each having a diameter of 2 mm. The height of the punch's upper edge is observed during measuring. 75 ml of deionized water (<8 µS) is filled into the cup and the rise of the punch's upper edge is noted down after 1 and 10 minutes (double determination).

Measurement of stringing

In order to measure stringing, a round glass rod having a thickness of 6 mm is dipped at room temperature 5 cm down into the product; after 30 seconds, it is pulled out of the product in vertical upward direction at a rate of 10 cm/s. The length at which the thread tears off is noted down in cm (triple determination).

EXAMPLE 1

2034 g acrylic acid, 79.2 g sodium hydroxide solution (50%-wt.), 4296.6 g water, 16.2 g trimethylolpropane triacrylate, and 13.2 g mercaptoethanol are prepared together at 30° C. and started with 13.08 g hydrogen peroxide (35%-wt.) and 60 g of a 1 %-wt. ascorbic acid solution. Thereupon the temperature of the formulation rises to 90° C. within 11 minutes. Stirring is continued for 30 minutes at this temperature. After addition of 62 g 35%-wt. hydrogen peroxide solution and 53 g 20%-wt. hydroxylamine hydrochloride solution stirring is continued for another hour. After the formulation has cooled to 35° C., neutralization is effected by adding 2455 g 44%-wt. sodium hydroxide solution, with the temperature not exceeding 40° C. At the same temperature, 80 g Marlazin KC 30/50 (quaternized fataminopolyglycol ether) (Hüls AG) and 16 g Aerosil 200 (highly dispersed silicon dioxide) (Degussa AG) are stirred in.

The viscosity of the product, measured in the Brookfield apparatus, depends on the rotational speed of the spindle:

spindle 4; 1 rpm: 22,700 mPas
spindle 4; 5 rpm: 18,600 mPas
spindle 4; 10 rpm: 16,200 mPas
 length of thread: 8 cm The product was stirred up with 3%-wt. EGDGE (ethylene glycol diglycidyl ether, supplier: Contract Chemicals); after 30 minutes it was printed in an amount of 120 g/$m^2$ on a polyester fabric by means of a perforated stencil and then dried at 190° C. for 3 minutes.

The finished fabric felt dry and did not stick together when rolled up.

Swelling height: 1 minute: 10 mm; 10 minutes: 11 mm.

EXAMPLE 2

The procedure of Example 1 was repeated, except that neither Marlazin KC 30/50 nor Aerosil 200 were used. The aqueous polymer solution was slightly more viscous (viscosities according to Brookfield):

spindle 4; 1 rpm: 22,800 mPas
spindle 4; 5 rpm: 19,700 mPas
spindle 4; 10 rpm: 17,900 mPas
 length of thread: 1 5 cm The product was cross-linked as in Example 1. The rolled-up nonwoven stuck slightly together and the swell rate was not as high.

Swelling height 1 minute: 8 mm; 10 minutes: 11 mm.

EXAMPLE 3

The polymerization of Example 1 was repeated, with the exception that 80 g Marlazin KC 30/50 (Hüls AG) but no Aerosil 200 was admixed after the addition of the sodium hydroxide solution.

Viscosities according to Brookfield:

spindle 4; 1 rpm: 22,700 mPas
spindle 4; 5 rpm: 18,600 mPas
spindle 4; 10 rpm: 16,200 mPas
 length of thread: 12 cm The product was printed in an amount of 120 g/$m^2$ on a polyester fabric by means of a perforated stencil and then dried at 190° C. for 3 minutes.

Swelling height: 1 minute: 10 mm; 10 minutes: 11 mm.

The dry fabric stuck together after rolling up.

EXAMPLE 4

The polymerization of Example 1 was repeated, except that 2.8 g triallylamine was used instead of trimethylolpropane triacrylate, and that the polymerization was started at 30° C.

Viscosity according to Brookfield:

spindle 3, 5 rpm: 6,200 mPas

The product was mixed with 0.5%-wt. Denacol EX 810 (ethylene glycol diglycidyl ether; tradename of Nagase), printed through a stencil on a polyester fabric in an amount of 95 g/$m^2$, and dried at 190° C. for 3 minutes. A nonwoven was obtained which felt dry and did not stick together even in rolled-up condition.

Swelling height 1 minute: 8 mm; 10 minutes: 9 mm.

EXAMPLE 5

339 g acrylic acid, 368.25 g sodium hydroxide solution (50%-wt.), 762 g water, 0.5 g trimethylolpropane-15 EO-triacrylate (Craynor 435 of Cray Vally), 6.0 g mercaptoethanol are prepared together at 30° C. and started with 2.18 g hydrogen peroxide (35%) and 10 g of a 1% solution of ascorbic acid. Thereupon the temperature rises to 82° C. within 12 minutes. At this temperature, stirring is continued for 30 minutes. After addition of 6.2 g 35% hydrogen peroxide solution and 5 g 20%-wt. hydroxylamine hydrochloride solution stirring is continued for another hour.

Subsequently, 5 g Marlazin UC 30/50 (Hüls AG) and 1 g Aerosil 200 are added, and the formulation is mixed thoroughly during cooling to 40° C.

Viscosities
spindle 4; 1 rpm: 40,000 mPas
spindle 4; 5 rpm: 29,000 mPas
spindle 4; 10 rpm: 22,000 mPas
length of thread: 7 cm The product was mixed up with 5%-wt. Denacol Ex 830 (PEG 400 diglycidyl ether of Nagase, Japan); after 1 hour, it was printed on a polyester fabric in an amount of 150 g/m² by means of a perforated stencil and dried at 190° C. for 3 minutes.

The finished fabric feels dry and does not stick together when rolled up.

Swelling height: 1 minute 8 mm, 1 0 minutes 11 mm.

Comparative Example 1

Uncrosslinked High-viscosity Polyacrylate

According to EP 188 091

The polymerization according to Example 1 was repeated, except that neither trimethylolpropane triacrylate nor another reactive cross-linker was used, and that the amount of mercaptoethanol was reduced to 3 g at the same time.

Viscosities according to Brookfield:
spindle 4; 1 rpm: 24,000 mPas
spindle 4; 5 rpm: 23,500 mPas
spindle 4; 10 rpm: 23,400 mPas
length of thread: 80 cm When this product was applied by means of the perforated stencil no regular pattern could be achieved because of the long thread.

Comparative Example 2

Uncrosslinked Low-Viscosity Polymer

According to EP 307 474

The polymerization according to Example 1 was repeated, with the exceptions that neither trimethylolpropane triacrylate nor another reactive cross-linker was used, that the amount of mercaptoethanol was doubled to 26.1 g, and that the polymerization was started at 30° C.

Viscosities according to Brookfield:
spindle 1, 5 rpm: 620 mPas
length of thread: 5 cm When this product was applied by means of the same perforated stencil as in Comparative Example 4, no printed dots could be obtained. The applied amount formed a thin layer. After drying at 190° C., the nonwoven was hard and bulky. It was nearly impossible to roll it up for storage or further processing.

Comparative Example 3

Demonstrates the Ineffectiveness of Diols Used as Reactive Cross-linkers 100 g of the product of Example 1 was mixed with 3 g ethylene glycol instead of ethylene glycol bisglycidyl ether and then printed with a coat density of 118 g/m² by means of a perforated stencil.

The coated fabric was dried at 190° C. for 3 minutes.

Swelling height: 0 mm after 1 minute, and 0 mm after 10 minutes.

We claim:

1. A printable swelling paste consisting of two components and based on a superabsorber, characterized in that component I comprises a) an aqueous solution of a pre-crosslinked polymer of (meth)acrylic acid and/or b) an aqueous solution of a pre-crosslinked polymer of (meth)acrylic acid which is partially present as a salt, and/or c) a copolymer of at least 50 mol-% of an aqueous solution of a pre-crosslinked polymer of (meth)acrylic acid with acrylamide wherein (meth)acrylic acid is present in a molar excess, said aqueous pre-crosslinked polymer a), b) and c) having been obtained by incorporating a cross-linking agent by copolymerization with the monomer or monomers, and that component II comprises or consists of a different reactive crosslinking agent capable of reacting with carboxylate or carboxylic acid functions.

2. The swelling paste according to claim 1 characterized in that component I is pre-crosslinked with 0.05–1.0 percent by weight, relative to the monomer quantity of component I, of said primary cross-linker.

3. The swelling paste according to claim 1 characterized in that component I additionally comprises a cationic surfactant.

4. The swelling paste according to claims 1 characterized in that component I additionally comprises an inorganic separating agent.

5. The swelling paste according to claim 1, characterized in that component I additionally comprises an organic separating agent.

6. The swelling paste according to claim 1 characterized in that component I is precrosslinked with trimethylolpropane triacrylate and/or N,N'-methylenebisacrylamide and/or triallylamine and/or ethoxylated trimethylolpropane triacrylate.

7. The swelling paste according to claim 1 characterized by a content of 95 to 99.9%-wt. of component I and 0.1–5%-wt. of component II, each relative to the total mixture of component I and II.

8. The swelling paste according to claim 1 characterized in that component II comprises as reactive cross-linking agent at least one di- or polyfunctional epoxide and/or one aziridine and/or one polyglycide ether and/or one multifunctional isocyanate and/or one polyester of polyols with low-boiling carboxylic acids and/or one epichlorohydrin, or that it consists thereof.

9. The swelling paste according to claim 8 characterized in that component II comprises as reactive cross-linker at least one (poly)ethylene glycol having two epoxy functions, or that it consists thereof.

10. The swelling paste according to claim 9 characterized in that component II comprises as reactive cross-linking agent ethylene glycol bisglycidyl ether and/or (poly) ethylene glycol bisglycidyl ether, or that it consists thereof.

11. A two-component package consisting of the two separately packaged components I and II according to claim 1, wherein component II consists of 0.1–5 percent by weight, relative to the amount of component I, of reactive cross-linking agent capable of further cross-linking component I.

12. A method comprising applying the swelling paste according to claim 1 as a cable insulating tape or to nonwovens for agriculture, for the clothing industry or for funeral homes.

13. A watertight cable insulating tape obtained by applying the swelling paste according claim 1 to a cable.

14. A method comprising mixing the two component package according to claim 11 to produce a printable swelling paste.

15. A printable swelling paste based on a superabsorber, obtained by homogeneously mixing component I as defined in claim 1, with component II as defined in claim 1.

16. A method for the production of cable insulating tapes and nonwovens, comprising applying the swelling paste of claim 1 on a prefabricated sheet material or on threads, followed by subsequent heating to temperatures between 100 and 200° C. to cross-link the polymers.

17. The swelling paste according to claim 1, wherein said salt of b) is a potassium, sodium or ammonium salt.

18. The swelling paste according to claim 1, wherein component I is a).

19. The swelling paste according to claim 1, wherein component I is b).

20. The swelling paste according to claim 1, wherein component I is c).

21. The swelling paste according to claim 1, characterized in that component I is pre-crosslinked with 0.1–0.5 percent by weight, relative to the monomer quantity of component I, of said cross-linking agent.

22. The swelling paste according to claim 1, wherein component I is pre-crosslinked with a cross-linking agent comprising or consisting of at least one di-, tri- or polyvinyl compound, a di, tri- or polyester of an unsaturated carboxylic acid, an alkylenebisacrylamide, a di-, tri- or polyallyl ether, an alkyl ester of an unsaturated carboxylic acid, a di-, tri- or polyallyl ester of a polycarboxylic acid or a di- or tri-allylamine, and component II comprises as reactive cross-linking agent at least one di- or polyfunctional epoxide and/or one aziridine and/or one polyglycidyl ether and/or one multifunctional isocyanate and/or one polyester of polyols with low-boiling carboxylic acids and/or one epichlorohydrin, or that it consists thereof.

* * * * *